(12) United States Patent
Doll

(10) Patent No.: US 9,981,208 B2
(45) Date of Patent: May 29, 2018

(54) CYCLONE RESERVOIR

(71) Applicant: Robert A. Doll, Nashotah, WI (US)

(72) Inventor: Robert A. Doll, Nashotah, WI (US)

(73) Assignee: Price Engineering Company, LLC, Hartland, WI (US)

( * ) Notice: Subject to any disclaimer, the term of this patent is extended or adjusted under 35 U.S.C. 154(b) by 808 days.

(21) Appl. No.: 14/487,655

(22) Filed: Sep. 16, 2014

(65) Prior Publication Data

US 2015/0075383 A1 Mar. 19, 2015

(51) Int. Cl.
*B01D 19/00* (2006.01)
*B04C 5/04* (2006.01)
*F15B 1/26* (2006.01)
*F15B 21/04* (2006.01)
*B04C 5/081* (2006.01)

(52) U.S. Cl.
CPC ............ *B01D 19/0057* (2013.01); *B04C 5/04* (2013.01); *B04C 5/081* (2013.01); *F15B 1/26* (2013.01); *F15B 21/044* (2013.01)

(58) Field of Classification Search
None
See application file for complete search history.

(56) References Cited

U.S. PATENT DOCUMENTS

| | | | |
|---|---|---|---|
| 4,816,156 A * | 3/1989 | Brombach | B04C 5/04 209/725 |
| 5,918,760 A | 7/1999 | Frodin et al. | |
| 6,220,283 B1 | 4/2001 | Saarinen et al. | |

| | | | |
|---|---|---|---|
| 2001/0054445 A1 * | 12/2001 | Evanovich | B29C 41/06 137/574 |

FOREIGN PATENT DOCUMENTS

| | | |
|---|---|---|
| EP | 0831238 A2 | 3/1998 |
| EP | 1947350 A2 | 7/2008 |
| EP | 2048368 A2 | 4/2009 |

OTHER PUBLICATIONS

PCT International Search Report and Written Opinion, PCT/US2014/055604, dated Jan. 7, 2015, 10 pages.

* cited by examiner

*Primary Examiner* — Amber R Orlando
*Assistant Examiner* — Phillip Y Shao
(74) *Attorney, Agent, or Firm* — Quarles & Brady LLP

(57) ABSTRACT

A cyclone reservoir for separation of an aerated portion of a hydraulic fluid and a related method of making the cyclone reservoir. The cyclone reservoir includes a lower chamber having a generally cylindrical side wall, a return port, and a suction port. An upper chamber is connected to the lower chamber by a neck section that places the interior volumes of the lower and upper chambers in fluid communication with one another. The neck section has a cross-sectional area taken perpendicular to a central axis of the reservoir that is smaller than a cross-sectional area of the lower chamber and the upper chamber at a different position along the central axis. The chambers and neck section may be made as a single-piece part by molding the reservoir by, for example, rotomolding. A reinforcement band may also go around the neck section to connect and support the upper and lower chambers.

14 Claims, 7 Drawing Sheets

CYCLONE RESERVOIR

CROSS-REFERENCE TO RELATED APPLICATION

This application claims the benefit of the filing date of U.S. Provisional Patent Application No. 61/878,656 filed Sep. 17, 2013, which is hereby incorporated by reference for all purposes as if set forth in its entirety herein.

STATEMENT OF FEDERALLY SPONSORED RESEARCH OR DEVELOPMENT

Not applicable.

BACKGROUND

The present invention relates to a hydraulic fluid reservoir and, in particular, to improvements to a cyclone reservoir for separation of aerated fluid by circulation.

In hydraulic systems where a hydraulic fluid is circulated by pumps, the hydraulic fluid often needs to be de-aerated. Conventionally, in stationary structures, the de-aeration requires the use of a large hydraulic tank with de-aeration by gravity.

U.S. Pat. No. 5,918,760, which is incorporated by reference for all purposes as if set forth in its entirety herein, which issued on Jul. 6, 1999 discloses a design of a hydraulic reservoir in which fluid is circulated so as to enable the reservoir size to be reduced while still permitting the fluid to be de-aerated.

However, there remains a need for improvements to cyclone reservoirs in order to both improve de-aeration and to reduce the cost and complexity of manufacture of such cyclonic reservoirs.

SUMMARY OF THE INVENTION

An improved cyclone reservoir is disclosed that provides improved separation of aerated hydraulic fluid and that can be made at low cost using molding techniques.

In accordance with one aspect of the invention, a cyclone reservoir is disclosed herein for the separation of an aerated portion of a hydraulic fluid. The cyclone reservoir includes a lower chamber extending along a central axis of the cyclone reservoir. The lower chamber has a generally cylindrical side wall that supports a return port and a suction port. The return port is for providing the hydraulic fluid to the lower chamber with a flow path that is initially substantially tangential to the side wall. The suction port is for receiving a flow of the hydraulic fluid from the lower chamber that is also substantially tangential to the side wall. An upper chamber is positioned above the lower chamber. A neck section connects the lower chamber to the upper chamber and places the interior volumes of the lower chamber and the upper chamber in fluid communication with one another. The neck section has a cross-sectional area taken perpendicular to the central axis that is smaller than a cross-sectional area of the lower chamber and the upper chamber at a different position along the central axis. The lower chamber, the upper chamber, and the neck section are a single-piece integrally molded component.

In use, the goose neck section effectively divides the upper chamber from the lower chamber to create a primary baffle there between. When the hydraulic fluid is introduced into the cyclone reservoir through the return port, a cyclonic flow is created in the lower chamber. This cyclonic flow causes the heavily aerated portion of the fluid to be moved radially inward toward the central axis of the cyclone and reservoir, while the denser and less aerated fluid is moved radially outward. As the aerated portion of the fluid is drawn toward the central axis, the less dense aerated fluid collects, the gas congregates, and buoyancy causes the gas to float upwards through the central opening in the neck section and into the upper chamber. The non-aerated fluid in the lower chamber, which has been drawn radially outward, can be fed from the cyclone reservoir via the suction port back into the hydraulic system where it can be reused.

In most forms of the cyclone reservoir, the return port may be vertically disposed along the central axis at a location above the suction port and may be closer to the upper chamber than the suction port is to the upper chamber. To improve separation efficiency, a secondary cyclonic chamber baffle may be formed in the side wall of the lower chamber. This secondary cyclonic chamber baffle may be vertically disposed along the central axis between the return port and the suction port and may extend an angular distance around the side wall of the lower chamber from vertically below the return port to vertically above the suction port to ensure that the flow path of the hydraulic fluid entering lower chamber includes at least one full cyclonic rotation around the interior volume the lower chamber before the flow is received in the suction port. In some forms, this secondary cyclonic chamber baffle may be integrally formed in the side wall of the lower chamber and may generally U-shaped in a plane perpendicular to the central axis. However, it is contemplated that in some forms, this secondary cyclonic chamber baffle may have a helical or semi-helical shape, form, or path.

Because the neck section may represent a point of weakness if the upper chamber is filled with fluid, an expandable reinforcement band may be clamped around the neck section that contacts and supports the upper chamber and the lower chamber and spans the neck section. Typically, it is contemplated that this band may be made of a strong material that is relatively stable in a moist environment, such as stainless steel. In order to accommodate reception of the band, each of the lower chamber and the upper chamber may have connection pegs formed in their respective side walls that extend radially outward from the respective side walls and the reinforcement band may have slots formed therein. Then, the connection pegs may be received in the slots to position the reinforcement band with respect to the lower chamber and the upper chamber. To accommodate attachment and adjustment, the connection pegs may taper in a radial direction to facilitate reception of the slots thereon and, additionally, at least some of the slots in the reinforcement band may have a length greater than the corresponding connection pegs on which they are received, thereby accommodating an adjustment in circumference of the reinforcement band around the upper chamber and the lower chamber. For ease of fabrication and to impart structural strength, the connection pegs may be integrally formed in the respective side walls of the upper chamber and the lower chamber.

In some forms of the cyclone reservoir, the lower tank may include a case drain return opening formed in a base wall at a lower axial end of the lower chamber. During operation, the case drain return opening can have a very low back pressure when compared to the return port.

To facilitate attachment, the upper chamber may include mounting connections and it is contemplated that those mounting connections may be placed on one of the various sides of the upper chamber in a manner to facilitate a desired angular placement of the return and suction ports on the lower chamber. Typically, the mounting connections can be cast in during a rotomolding process and so selection of a wall to mold these connections into can be readily varied.

As will be described in greater detail below, the upper chamber, the lower chamber, and the neck section may be fabricated using a molding process. While rotomolding is contemplated as being a particularly advantageous method for fabricating a one-piece part, it is contemplated that other forms of molding such as blow molding or injection molding might also be implemented.

In accordance with another aspect of the invention, a method of making a cyclone reservoir, as described above, is disclosed herein. The method includes the step of molding the lower chamber, the upper chamber, and the neck section in which the lower chamber, the upper chamber, and the neck section are a single-piece integrally molded component. In this way, the lower chamber, the upper chamber, and the neck section may be integrally formed as a single piece without plastic welding or gluing.

In some forms of the method, the step of molding the cyclone reserve may preferably include rotomolding the cyclone reservoir, although other forms of molding, such as blow molding or injection molding may also be suitable.

To provide support for the neck when the cyclone reservoir is filled with fluid, the method may further include the step of clamping a reinforcement band around the neck section to connect the lower chamber to the upper chamber.

Additionally, during the step of molding, a secondary cyclonic chamber baffle of the type described above may be formed in the side wall of the lower chamber. That is to say, the formation of this baffle can occur at the same time as the lower chamber, rather than being a separately installed component or a pre-molding insert.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION OF THE PREFERRED EMBODIMENT

Referring first to FIGS. 1-8, a cyclone reservoir 10 according to one embodiment of the present invention is illustrated for separating an aerated portion of a hydraulic fluid. It will be appreciated that the illustrated cyclone reservoir is one exemplary embodiment of a cyclone reservoir according to the invention and that variations to the structure or method of fabricating the structure could be made that still fall within the scope of the invention.

Figure 5:
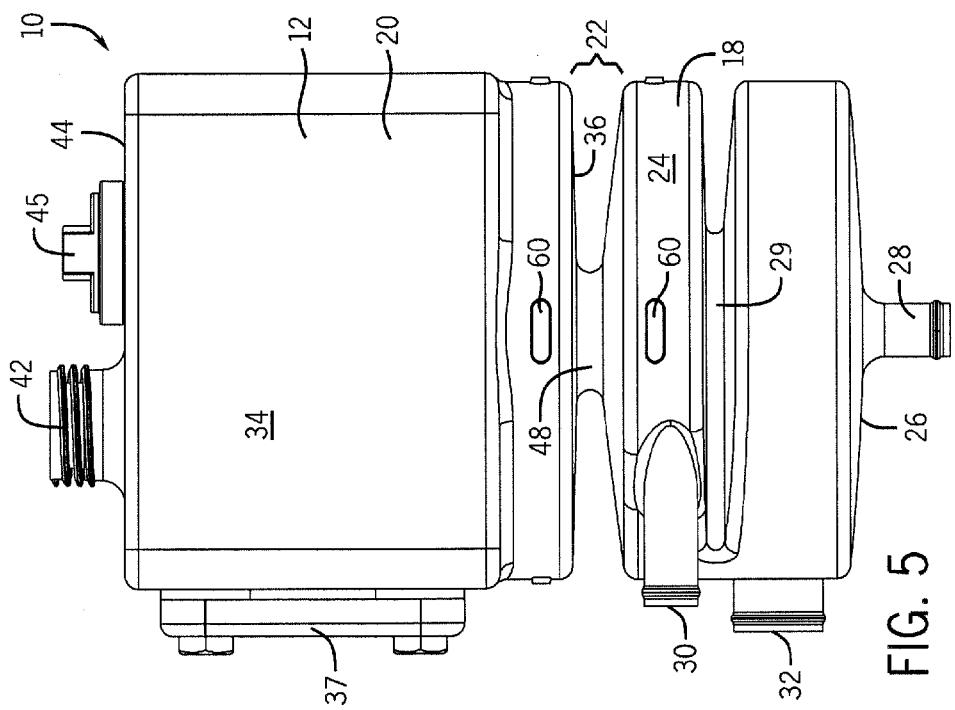
FIG. 5 is a right side elevation view of the cyclone reservoir similar to FIG. 2, but in which a reinforcement band has been removed from a neck section of the cyclone reservoir to reveal the neck section for illustrative purposes.
Figure 4:
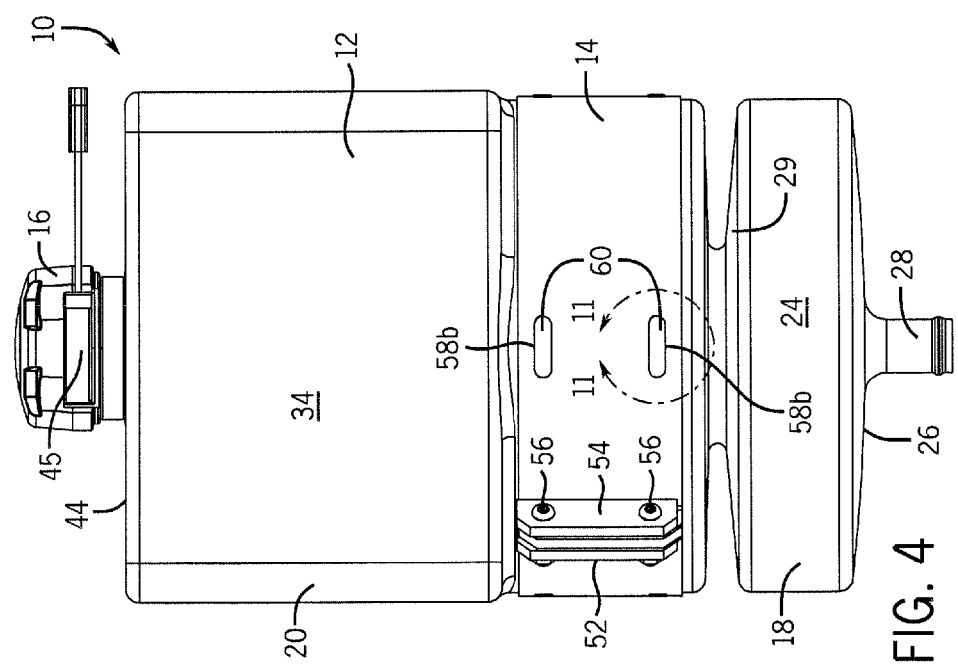
FIG. 4 is a rear side elevation view of the cyclone reservoir of FIG. 1.
Figure 6:
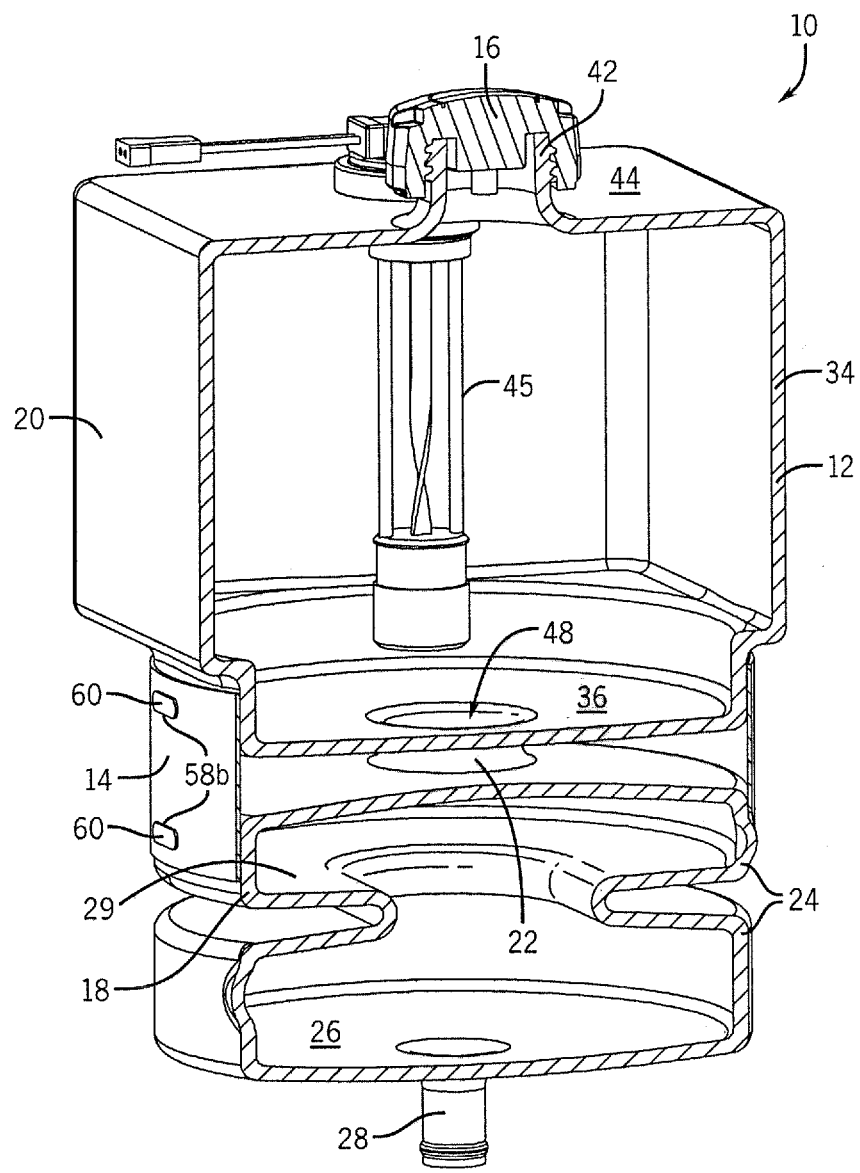
FIGS. 6 and 7 are a cross-sectional side views taken through line 6-6 of FIG. 1 and line 7-7 of FIG. 3, respectively, illustrating the interior of the cyclone reservoir.
Figure 7:
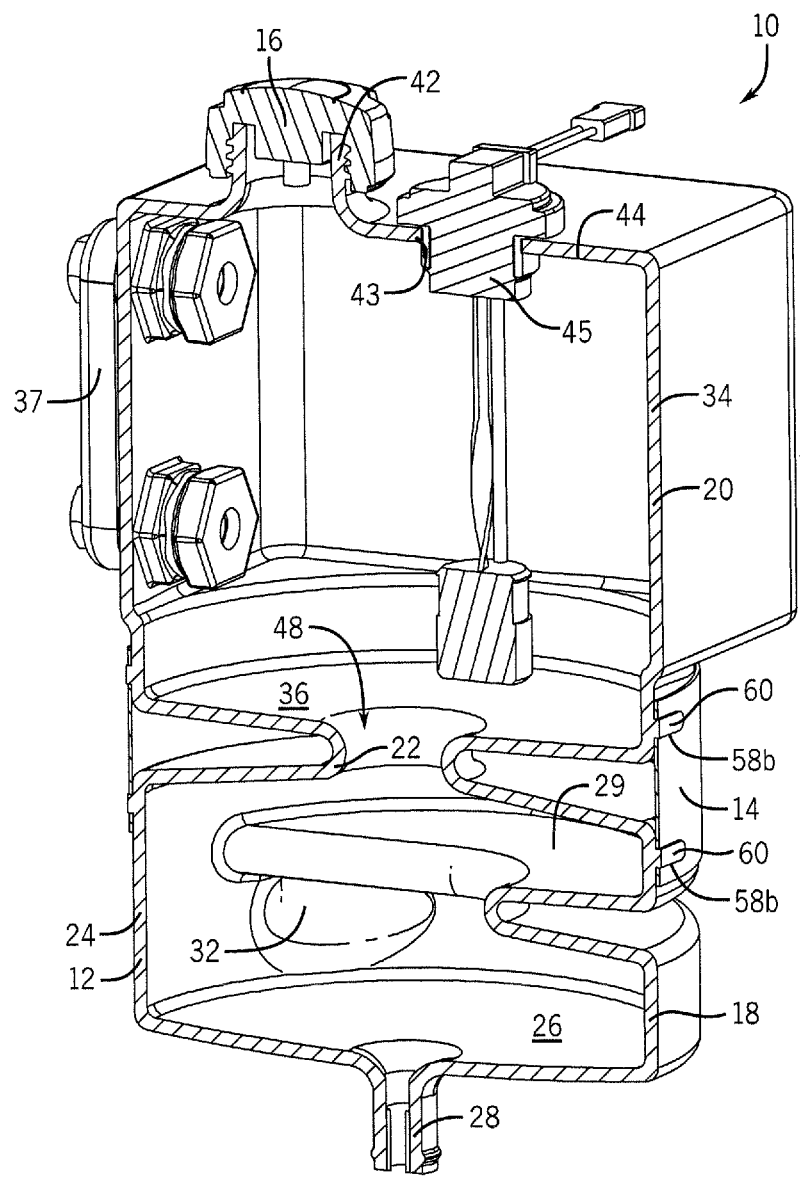

The cyclone reservoir 10 primarily includes a single-piece tank portion 12 which is best illustrated in FIG. 5 apart from a reinforcement band 14 and a top cap 16. In the particular embodiment illustrated, the tank portion 12 is a rotomolded component made from a plastic material. Accordingly, the tank portion 12 can be fabricated without needing to plastic weld or glue various components together. This ultimately results in a more robust construction that is less susceptible to leakage as there are not seams lines of joining on the tank portion 12 in comparison to fabrication techniques in which the tank parts are separately formed and joined.

Again, although the illustrated tank portion 12 of the cyclone reservoir is rotomolded as a single-piece component from a plastic material, it could be made as a single-piece integrally molded component in other ways. For example, it is contemplated that the tank portion 12 could be blow molded or injection molded. However, given the shape of the tank portion 12, if the tank portion 12 is injection molded, then a bladder or the like might be used to form the interior profile of the tank portion 12.

In any event, the tank portion 12 of the cyclone reservoir 10 is best understood as having generally three sections including a lower chamber 18, an upper chamber 20, and a neck section 22. As illustrated, these three sections all lie along a central axis of the cyclone reservoir 10 and are arranged such that the lower chamber 18 and the upper chamber 20 are connected by the narrower neck section 22 to place the interior volumes of the lower chamber 18 and the upper chamber 20 in fluid communication with one another. However, it is also contemplated that the upper chamber need not be centered on or even lie on the central axis.

Figure 8:
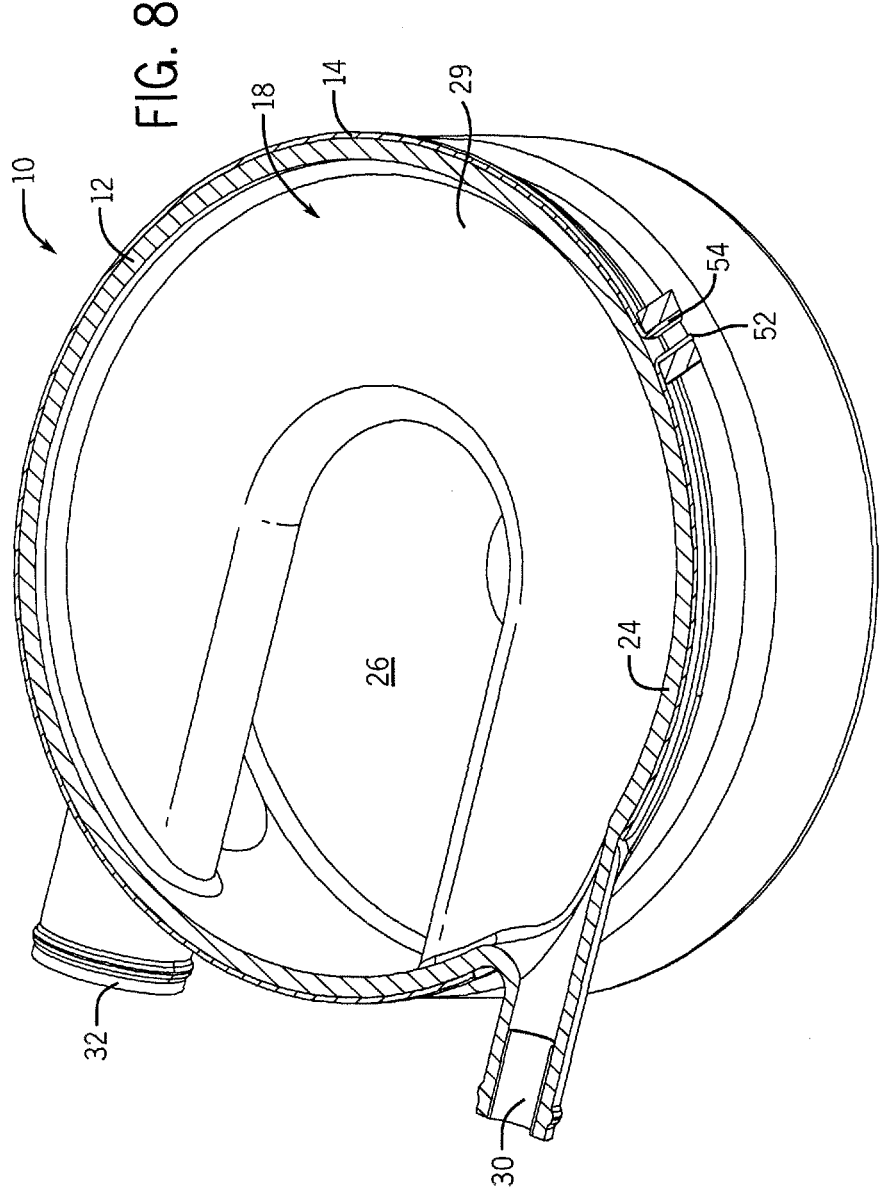
FIG. 8 is a perspective cross-sectional view taken through line 8-8 of FIG. 2.

The lower chamber 18 has a generally cylindrical side wall 24 that is centered around the central axis of the cyclone reservoir 10. The side wall 24 is "generally" cylindrical because it has a form that, in an abstract sense resembles a cylinder; however, it should be appreciated that the term "generally" is used to indicate that the wall need not be perfectly cylindrical (that is, there may be some roundness or taper to them) and that other features such as a secondary baffle or the ports (such as those described below) may be formed in these wall that depart from a perfectly cylindrical geometry. At a lower end, this cylindrically shaped side wall 24 of the lower chamber 18 extends downward and radially inward to form a base wall 26 that has a case drain return opening 28 centrally formed therein. At an upper end of the lower chamber 18, the side wall 24 also extends radially inward to transition into the neck section 22. Between these upper and lower ends, the inner volume of the lower chamber 18 is generally cylindrical or tubular shaped except for a secondary cyclonic chamber baffle 29. This secondary cyclonic chamber baffle 29 is generally U-shaped, when viewed from above, as best illustrated in FIG. 8 and partially bifurcates the lower chamber 18 into two halves. As illustrated, the secondary cyclonic chamber baffle 29 is integrally formed in the side wall 24 of the lower chamber 18 and is generally U-shaped, lying in a plane perpendicular to the central axis. However, in other embodiments, it is contemplated that the secondary cyclonic chamber baffle may have a helical shape or form, also extending vertically some distance downward as it angularly extends around the interior of the side wall of the lower chamber.

On the generally cylindrical side wall 24, the lower chamber 18 supports a return port 30 (positioned vertically above the secondary cyclonic chamber baffle 29 along the central axis) and a suction port 32 (positioned vertically below the secondary cyclonic chamber baffle 29 along the central axis). The return port 30 is positioned and arranged to provide the hydraulic fluid from the external hydraulic system via the return port 30 into the lower chamber 18 with a flow path that is initially substantially tangential to the side wall 24 so as to induce cyclonic flow in the lower chamber 18. The suction port 32 is positioned and arranged to receive a flow of the hydraulic fluid from the lower chamber 18 that is then returned to the external hydraulic system after the fluid has had at least a portion of any aerated fluid separated in the cyclone reservoir 10. The removal of fluid via the suction portion 32 also helps to promote the cyclonic flow in the lower chamber 18. The return port 30 and the suction port 32 are arranged such that the return port 30 tangentially introduces the flow to the lower chamber 18 in a counter-clockwise direction (when viewed from the top side of the cyclone reservoir 10) and the suction port 32 tangentially receives this counter-clockwise cyclonic flow. In other embodiments, the cyclonic flow might be induced in a reverse direction (i.e., clockwise as viewed from the top side of the cyclone reservoir 10).

In the direction of cyclonic flow, the secondary cyclonic chamber baffle 29 angularly extends from just below the return port 30 to just above the suction port 32, there then being an angular gap in the baffle 29 in the space between the suction port 32 and the return port 30 so that the fluid may vertically drop in this gap, to ensure that the fluid introduced into the lower chamber 18 from the return port 30 is retained in the lower chamber for at least 540 degrees of rotation within the chamber before the fluid can exit the lower chamber 18 via the suction port 32. That is to say the secondary cyclonic baffle 29 ensures that the flow path of the hydraulic fluid entering lower chamber 18 includes at least one full cyclonic rotation around the interior volume the lower chamber 18 before the flow is received in the suction port 32. Accordingly, the presence of the baffle 29 can thereby increase the average dwell time of the fluid in the lower chamber 18 and approximately double the efficiency of the separation of the aerated fluid from the de-aerated fluid as the result of cyclonic flow.

Although a baffle 29 is illustrated and improves the efficiency of the separation, it is contemplated that a baffle 29 may be omitted and that the lower chamber 18 may simply have cylindrical side wall and either the height differential between the return port 30 and the suction port 32 may be sufficiently large or the cyclonic flow conditions established such that an adequate average dwell time for the fluid in the lower chamber 18 is established. For example, to separate the aerated portion of the fluid from a de-aerated portion of the fluid, the return port 30 can be positioned at a greater height along the central axis than the suction port 32. That is to say, the return port 30 is disposed at a location above the suction port 32 and that is closer to the upper chamber 20 than the suction port 32 is to the upper chamber 20.

Further, although the baffle 29 is illustrated as being integrally molded in the side wall 24 of the lower chamber 18, it is also contemplated that the baffle 29 might be differently formed in or installed in the lower chamber 18 regardless of how the cyclone reservoir 10 is fabricated. For instance, in the event that the lower chamber 18 is formed of a metal material, the baffle 29 could be welded into the tank or otherwise mechanical attached. It is therefore contemplated that the baffle 29 in the lower chamber 18 may also be implemented in cyclonic reservoir not necessarily having the integrally formed lower chamber 18, the upper chamber 20, and neck section 22.

Figure 1:
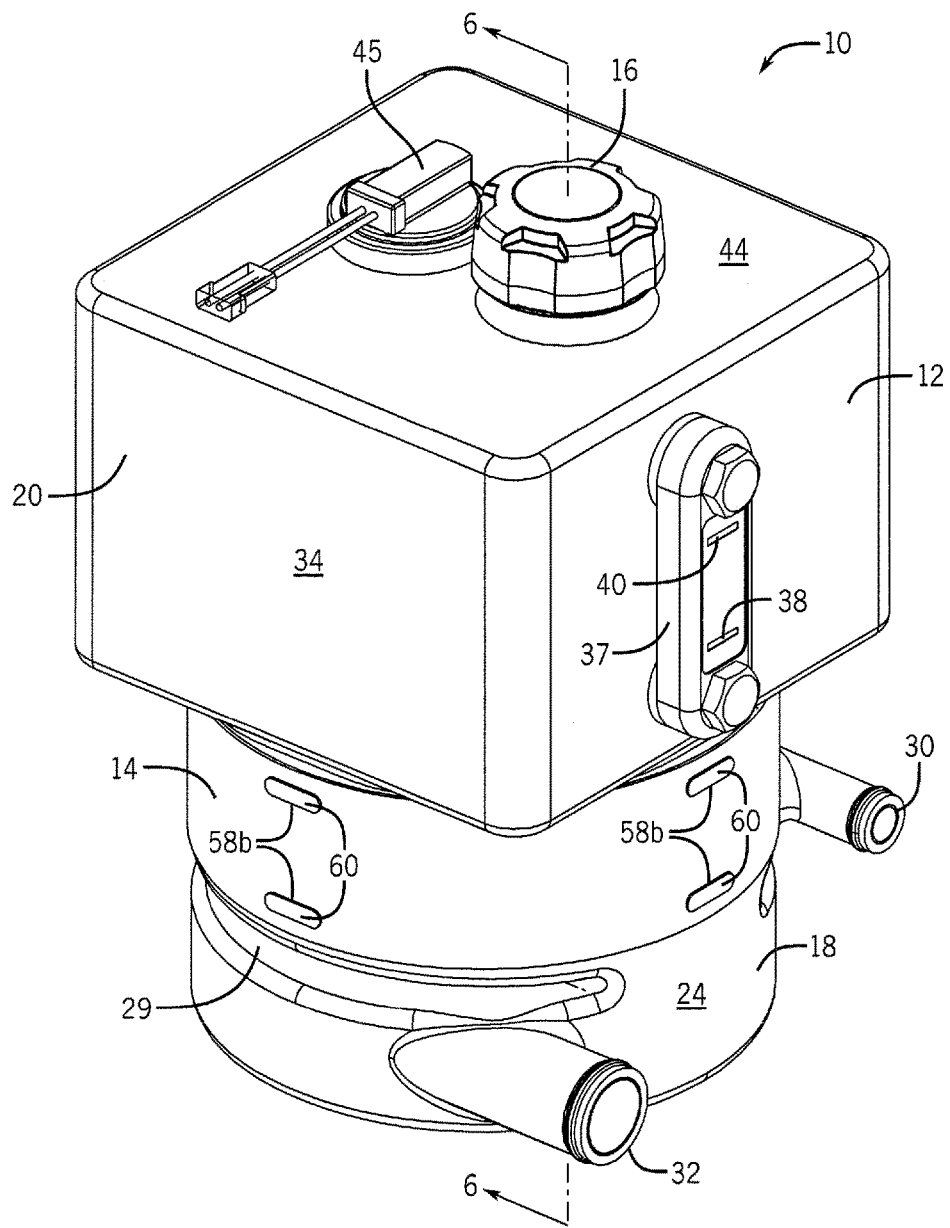
FIG. 1 is a top, front, left side perspective view of a cyclone reservoir according to one embodiment of the present invention.
Figure 2:
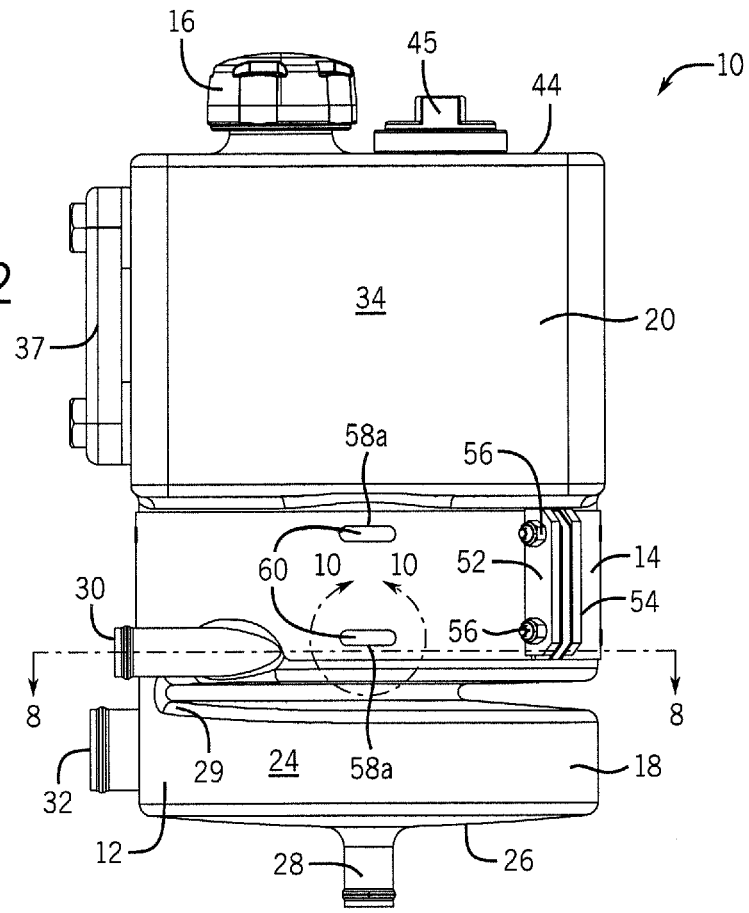
FIG. 2 is a right side elevation view of the cyclone reservoir of FIG. 1.
Figure 3:
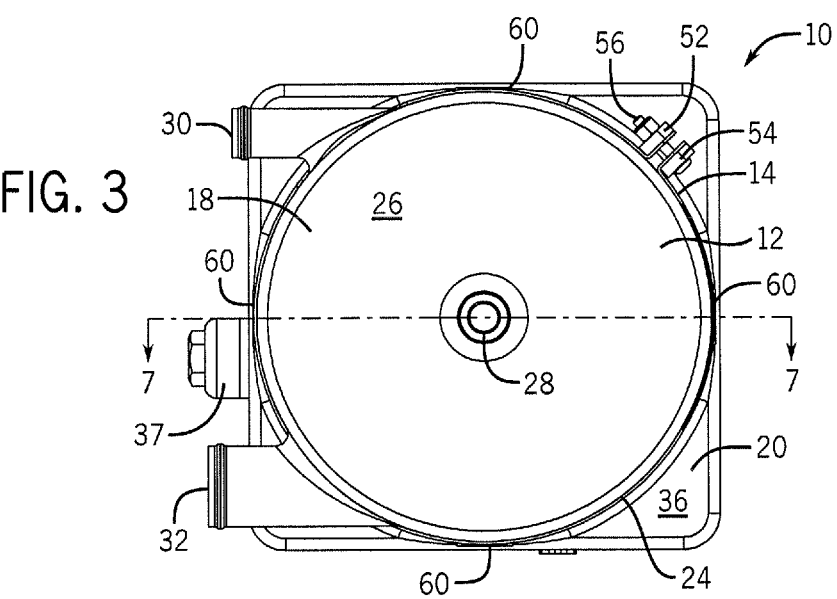
FIG. 3 is a bottom plan view of the cyclone reservoir of FIG. 1.

In the illustrated embodiment, the upper chamber 20 is positioned above the lower chamber 18 along the central axis of the cyclone reservoir 10 (although as previously observed, the upper chamber 20 does not necessarily need to be co-axial with the lower chamber 18). The upper chamber 20 has a side wall or side walls 34; although, because the upper chamber 20 serves to receive the aerated portion of the fluid from the lower chamber 18 and helps to keep this aerated portion separated from the hydraulic fluid in the lower chamber 18, the profile of the side walls 34 of the upper chamber 20 are not particularly important for the purposes of establishing a flow pattern in the illustrated embodiment since separation by cyclonic action is not actively occurring in the upper chamber 20. However, the bottom wall 36 of the upper chamber 20 should taper radially inwards in the region of the neck section 22 in order to form or establish a baffle that helps to keep separate the fluid in the upper chamber 20 from the lower chamber 18. As best illustrated in FIG. 1, there is a sight glass 37 mounted on one of the side walls 34 (and in communication with the fluid in the upper chamber 20) and this sight glass 37 has minimum and maximum lines 38 and 40 in order to provide a visual indication of the preferred fill volume for the cyclone reservoir 10. This difference in volume permits for some adjustment in the fluid level over the stroke of a hydraulic cylinder for example and may also provide some additional fluid in the event of a small leak or fluid loss. There is also a threaded opening 42 on a top wall 44 of the upper chamber 20 that receives the top cap 16 which provides access to the cyclone reservoir 10 when the top cap 16 is removed and a separate opening 43 on the top wall 44 that receive an level sensor 45 that extends into the upper chamber 20 to read the fluid level in the tank.

Although not illustrated, the upper chamber 20 may also have a number of mounting connections on one or more of the sides of the side walls 34 to accommodate mounting or securing of the cyclone reservoir 10 to another body via the upper chamber 20. In the particular form illustrated the upper chamber 20 is substantially rectangular, having four side walls. It is contemplated that during a rotomolding process, inserts may be potentially placed on any of these four side walls, as desired to permit various mounting orientations based on the intended tank mounting configuration. By altering the side wall on which the mounting connections are installed, the relative orientation of the ports 30 and 32 can likewise be easily altered when the reservoir 10 is mounted.

As mentioned above, the lower chamber 18 and the upper chamber 20 are connected via the neck section 22, which creates a baffle with a central opening 48 between the lower chamber 18 and the upper chamber 20 to place the two chambers in fluid communication with one another. Because the purpose of this neck section 22 is to provide a wall of separation with a central opening 48 to permit separation of and maintain separation of the aerated fluid from the rest of the hydraulic fluid, the neck section 22 (or the central opening 48 it forms) has a cross-sectional area taken perpendicular to the central axis that is smaller than a cross-sectional area of the lower chamber 18 and the upper chamber 20 (or the area of their respective internal volumes along those cross sectional planes) at a different positional heights along the central axis. To provide some idea of how much smaller the cross sectional area of the neck section 22 may be compared to the adjacent chambers 18 and 20, comparative ratios or percentages of the cross sections relative to one another are now provided. For example, in some forms, the the cross sectional area taken through the narrowest portion of the neck section 22 perpendicular to the central axis could be at least 50%, 55%, 60%, 65%, 70%, 75%, 80%, 85%, or 90% smaller than the average cross sectional area taken through either one or both of the lower chamber 18 and the upper chamber 20.

The underside of the neck section 22 in the lower chamber 18 may be cone shaped or frusto-conically shaped, gradually decreasing in diameter as it extends inwardly and upwardly from the side walls 24 toward the center of the neck section 22. Accordingly, the bottom surface of the top wall of the lower chamber 18 may extend at an angle oblique relative to the central axis of the lower chamber 18. This helps to assist in the migration of the less-dense aerated fluid upward from the lower chamber 18 into the upper chamber 20.

Figure 9:
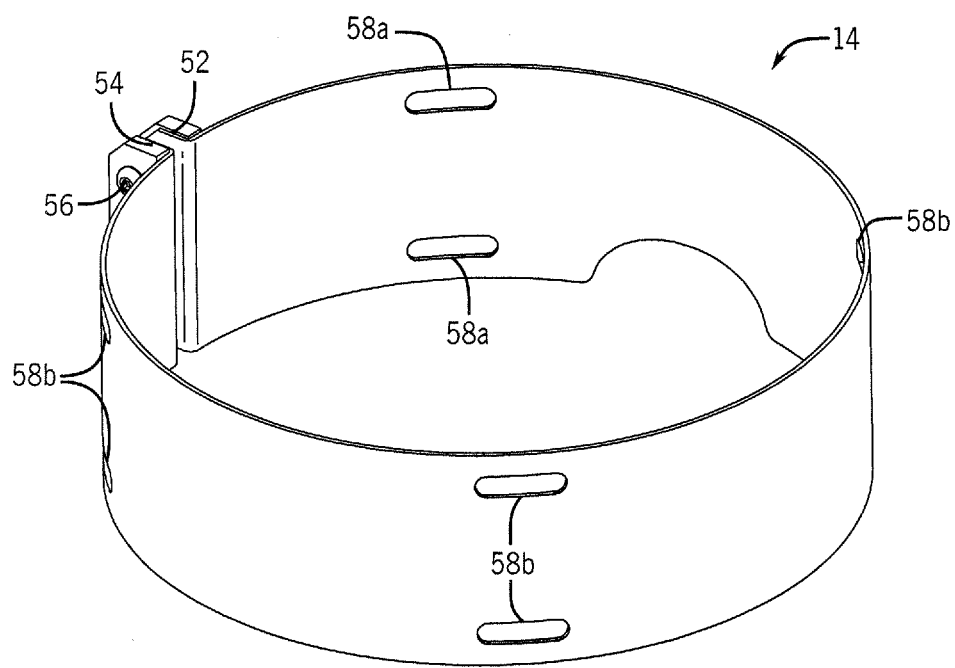
FIG. 9 is a perspective view of the reinforcement band apart from the cyclone reservoir.

Because this neck section 22 creates a potential point of weakness under the weight of the fluid or under cyclic fatigue (as the lower chamber 18 may be inclined to oscillate relative to the upper chamber 20 if the upper chamber 20 is fixedly mounted and the fluid flows into the cyclone reservoir 10 at a pulsing frequency), an expandable reinforcement band 14 can be clamped around the neck section 22 that contacts and supports the upper chamber 20 and the lower chamber 18 and that spans the neck section 22. The reinforcement band 14 is shown clamped around the neck section 22 of the tank portion 12 in FIGS. 1-4 and 6-8 and the tank portion 12 is shown in FIG. 5 with the reinforcement band 14 having been removed from it. The reinforcement band 14 is illustrated apart from the tank portion 12 in FIG. 9.

In the form illustrated, this reinforcement band 14 is fabricated from a stainless steel material and has two circumferential or angular ends 52, 54 that are attached together via fasteners 56 that can be tightened or loosened in order to expand or collapse the circumference of the reinforcement band 14. Four pairs of slots 58a, 58b are formed in two annular rows at different heights in the reinforcement band 14 in which the pairs of slots 58a, 58b are spaced approximately 90 degrees apart from one another about the circumferential direction.

In order to better receive the reinforcement band 14, each of the lower chamber 18 and the upper chamber 20 have connection pegs 60 integrally formed in their respective side walls 24 and 34 that extend radially outward from the side walls 24 and 34. When the reinforcement band 14 is received over the neck section 22 of the tank portion 12, the connection pegs 60 are received in the slots 58a, 58b to position the reinforcement band 14 with respect to the lower chamber 18 and the upper chamber 20.

The connection pegs 60 can taper in a radial direction to better facilitate reception of the corresponding slots 58a, 58b of the reinforcement band 14 on them. Also in the form illustrated, there are four pairs of connection pegs 60 that are spaced apart approximately 90 degrees from one another about the central axis of the cyclone reservoir 10 (generally corresponding to the spacing and arrangement of the corresponding slots 58a, 58b).

Figures 10, 11:
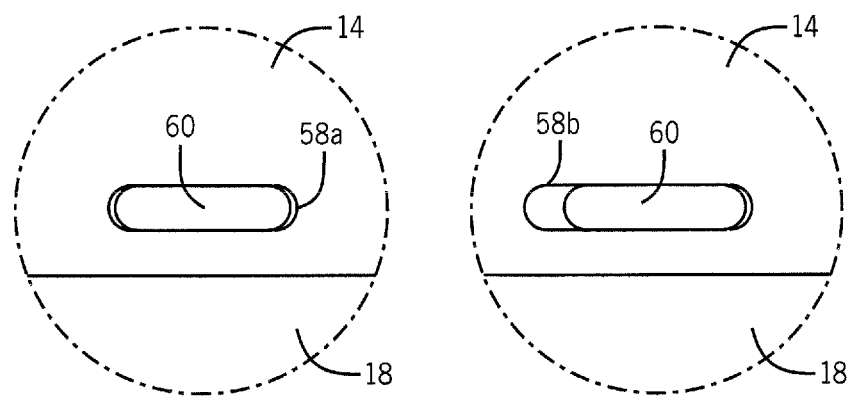
FIG. 10 is a detailed view of section 10-10 from FIG. 2 showing one of the slot and peg connections.
FIG. 11 is a detailed view of section 11-11 from FIG. 4 showing one of the slot and peg connections in which some clearance permits the circumferential adjustment of the reinforcement band during attachment or removal from the tank portion of the cyclone reservoir.

As illustrated in FIG. 10, one pair of these connection pegs 60 extends with an angular extent or length that corresponds nearly exactly with the angular extent or length of the corresponding slots 58a. This pair of pegs 60 and slots 58a helps to establish the angular position of the reinforcement band 14 relative to the tank portion 12 of the cyclone reservoir 10 because there is little or no play in between them.

As illustrated in FIG. 11, the other three pairs of pegs 60 and slots 58b are designed such that the slots 58b have angular extents or lengths that are greater than the angular extents or lengths of the corresponding pegs 60 onto which they are received. This configuration accommodates an adjustment in the circumference of the reinforcement band 14 around the upper chamber 20 and the lower chamber 18 as the slots 58b have a length that provides clearance or play as the reinforcement band 14 is tightened into place (or loosened in the event that the band 14 needs to be removed).

It will be appreciated that the particular quantity and geometric arrangement of pegs and slots may be modified and that the illustrated embodiment is only one possible arrangement for them. For example, rather than pegs being formed on the tank portion, recesses might be formed in the tank portion and the reinforcement band might be formed with radially inward facing projections that are received in the recesses of the tank. Further, the number of peg and slots or their angular spacing could also be modified. As still another alternative, the reinforcement band might be nearly perfectly tubular (i.e., not have any slots or projections apart from the connections used to expand or contract the circumference of the band) and be received in a correspondingly shaped single large recess formed in the exterior surfaces of the upper chamber and the lower chamber (albeit with a gap in the region of the neck section).

Additionally, other structure(s) may be implemented in this cyclone reservoir that is/are not illustrated in order to further improve segregation of the aerated from the de-aerated fluid or to cause nucleation and removal of gas from the aerated portion of the hydraulic fluid. For example, an inverted cone might be placed in the lower chamber and/or nucleation screens may be placed in the upper chamber with the fluid from the upper chamber being re-introduced into the lower chamber via the return port for further processing after de-aeration.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A cyclone reservoir for separation of an aerated portion of a hydraulic fluid, the cyclone reservoir comprising:
   a lower chamber extending along a central axis of the cyclone reservoir and having a generally cylindrical side wall, the lower chamber having a return port supported by the side wall for providing the hydraulic fluid from the return port to the lower chamber with a flow path that is initially substantially tangential to the side wall and the lower chamber further having a suction port supported by the side wall for receiving a flow of the hydraulic fluid from the lower chamber that is also substantially tangential to the side walls;

an upper chamber positioned above the lower chamber; and a neck section connecting the lower chamber to the upper chamber and placing interior volumes of the lower chamber and the upper chamber in fluid communication with one another, wherein the neck section has a cross-sectional area taken perpendicular to the central axis that is smaller than a cross-sectional area of the lower chamber and the upper chamber at a different position along the central axis; and a cyclonic chamber flow separator in the lower chamber that is vertically disposed along the central axis between the return port and the suction port, the cyclonic chamber flow separator extending an angular distance around the side wall of the lower chamber from vertically below the return port to vertically above the suction port to ensure that the flow path of the hydraulic fluid entering the lower chamber includes at least one full cyclonic rotation around the interior volume the lower chamber before the flow is received in the suction port;

wherein the lower chamber, the upper chamber, and the neck section are a single-piece integrally molded component.

2. The cyclone reservoir of claim 1, wherein the return port is vertically disposed along the central axis at a location above the suction port and is closer to the upper chamber than the suction port is to the upper chamber.

3. The cyclonic reservoir of claim 1, wherein the cyclonic chamber flow separator is integrally formed in the side wall of the lower chamber and is generally U-shaped in a plane perpendicular to the central axis.

4. A cyclone reservoir for separation of an aerated portion of a hydraulic fluid, the cyclone reservoir comprising:

a lower chamber extending along a central axis of the cyclone reservoir and having a generally cylindrical side wall, the lower chamber having a return port supported by the side wall for providing the hydraulic fluid from the return port to the lower chamber with a flow path that is initially substantially tangential to the side wall and the lower chamber further having a suction port supported by the side wall for receiving a flow of the hydraulic fluid from the lower chamber that is also substantially tangential to the side walls;

an upper chamber positioned above the lower chamber;

a neck section connecting the lower chamber to the upper chamber and placing interior volumes of the lower chamber and the upper chamber in fluid communication with one another, wherein the neck section has a cross-sectional area taken perpendicular to the central axis that is smaller than a cross-sectional area of the lower chamber and the upper chamber at a different position along the central axis; and an expandable reinforcement band clamped around the neck section that contacts and supports the upper chamber and the lower chamber and spans the neck section;

wherein the lower chamber, the upper chamber, and the neck section are a single-piece integrally molded component.

5. The cyclone reservoir of claim 4, wherein each of the lower chamber and the upper chamber have connection pegs formed in their respective side walls that extend radially outward from the respective side walls and the reinforcement band has slots formed therein and wherein the connection pegs are received in the slots to position the reinforcement band with respect to the lower chamber and the upper chamber.

6. The cyclone reservoir of claim 5, wherein the connection pegs taper in a radial direction.

7. The cyclone reservoir of claim 5, wherein at least some of the slots in the reinforcement band have a length greater than the corresponding connection pegs on which they are received, thereby accommodating an adjustment in circumference of the reinforcement band around the upper chamber and the lower chamber.

8. The cyclone reservoir of claim 5, wherein the connection pegs are integrally formed in the respective side walls of the upper chamber and the lower chamber.

9. The cyclone reservoir of claim 1, wherein the lower tank includes a case drain return opening formed in a base wall at a lower axial end of the lower chamber and wherein, during operation, the case drain return opening has a very low back pressure when compared to the return port.

10. A method of making a cyclone reservoir of claim 1, comprising the step of molding the lower chamber, the upper chamber, and the neck section wherein the lower chamber, the upper chamber, and the neck section are a single-piece integrally molded component.

11. The method of claim 10, wherein the cyclone reservoir is rotomolded.

12. The method of claim 11, wherein the lower chamber, the upper chamber, and the neck section are integrally formed as a single piece without plastic welding or gluing.

13. The method of claim 10, further comprising the step of clamping a reinforcement band around the neck section to connect the lower chamber to the upper chamber and to reinforce the neck section.

14. The method of claim 10, wherein, during the step of molding, cyclonic chamber flow separator is formed in the side wall of the lower chamber, the cyclonic chamber flow separator being vertically disposed along the central axis between the return port and the suction port and extending an angular distance around the side wall of the lower chamber from vertically below the return port to vertically above the suction port.

* * * * *

UNITED STATES PATENT AND TRADEMARK OFFICE
CERTIFICATE OF CORRECTION

PATENT NO.          : 9,981,208 B2
APPLICATION NO.     : 14/487655
DATED               : May 29, 2018
INVENTOR(S)         : Robert A. Doll Page 1 of 1

It is certified that error appears in the above-identified patent and that said Letters Patent is hereby corrected as shown below:

On the Title Page

Item (60) Insert:
--(60) Provisional Application No. 61/878,656 filed on September 17, 2013.--

Signed and Sealed this
Twenty-fourth Day of July, 2018

Andrei Iancu
*Director of the United States Patent and Trademark Office*